United States Patent
Zhang et al.

(10) Patent No.: US 8,331,366 B2
(45) Date of Patent: Dec. 11, 2012

(54) SYSTEM AND METHOD FOR DEPLOYMENT OF A SOFTWARE IMAGE TO A PLURALITY OF TARGET DEVICES

(75) Inventors: Weijia Zhang, Round Rock, TX (US); Rizwan Ali, Austin, TX (US); Richard B. Landau, Austin, TX (US); David Mar, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 667 days.

(21) Appl. No.: 11/734,142

(22) Filed: Apr. 11, 2007

(65) Prior Publication Data

US 2008/0256219 A1    Oct. 16, 2008

(51) Int. Cl.
*H04L 12/28* (2006.01)

(52) U.S. Cl. .................. 370/390; 709/223; 707/737

(58) Field of Classification Search .............. 370/255, 370/464
See application file for complete search history.

(56) References Cited

U.S. PATENT DOCUMENTS

| | | | | |
|---|---|---|---|---|
| 5,721,914 | A * | 2/1998 | DeVries | 707/10 |
| 6,543,047 | B1 | 4/2003 | Vrhel, Jr. et al. | 717/121 |
| 6,925,345 | B2 | 8/2005 | Campbell et al. | 700/103 |
| 6,938,250 | B2 | 8/2005 | Cohen et al. | 717/178 |
| 6,947,954 | B2 | 9/2005 | Cohen et al. | 707/104.1 |
| 7,062,764 | B2 | 6/2006 | Cohen et al. | 717/171 |
| 7,069,551 | B2 | 6/2006 | Fong et al. | 717/171 |
| 7,072,958 | B2 | 7/2006 | Parmar et al. | 709/223 |
| 7,257,628 | B2 * | 8/2007 | Liskov et al. | 709/223 |
| 7,415,519 | B2 * | 8/2008 | Abbondanzio et al. | 709/226 |
| 2008/0082561 | A1 * | 4/2008 | Dere | 707/101 |
| 2010/0005160 | A1 * | 1/2010 | Sparks | 709/222 |

OTHER PUBLICATIONS

Zhang et al. "A Modeling Perspective of Image-Based Installation" Dell White Paper (pp. 1-14), Mar. 2002.

* cited by examiner

*Primary Examiner* — Kevin C Harper
*Assistant Examiner* — Henry Baron
(74) *Attorney, Agent, or Firm* — Baker Botts L.L.P.

(57) ABSTRACT

A system and method for deployment of a software image to a plurality of target devices are disclosed. A method may include communicatively coupling a root node device to a plurality of internal node devices, and communicatively coupling a plurality of leaf node devices to the root node devices and the internal node devices. The root node device may transmit a software image from the root node device to at least two of the internal node devices, and each internal node device may transmit the software image to at least one other internal node device or leaf node device.

10 Claims, 6 Drawing Sheets

SYSTEM AND METHOD FOR DEPLOYMENT OF A SOFTWARE IMAGE TO A PLURALITY OF TARGET DEVICES

TECHNICAL FIELD

The present disclosure relates in general to the installation and deployment of software images, and more particularly to a system and method for deployment of a software image to a plurality of target devices.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Conventionally, installation of operating systems and application programs on an information handling system is achieved by determining the hardware characteristics of the information handling system, copying and source files compatible with such hardware characteristics, installing the files, and then configuring the installed files, often based on user input. This conventional approach to installation is often time consuming and many of the steps are the same regardless of the system on which the application or operating system is installed. With these conventional techniques, discovering system information, copying and installing files, and configuration based on use input requires a significant length of time.

In order to reduce the length of time required to install and configure operating systems and/or application programs on an information handling system, image-based installation procedures have been utilized. Under such image-based installation procedures, an information handling system on which the desired software is to be installed, also referred to as a "target device," may boot from a minimal operating system that configures minimal hardware and configures minimal settings for the target device. The target device may then receive, for example via a network or computer-readable medium (e.g., hard disk drive or compact disk), a software image of the software to be installed. Using the minimal operating system, the target device may apply the received software image, and then boot into the applied software image. This approach allows common installation tasks to be performed during the creation of the software image, obviating the need for such tasks to be repeated on the target computer, and thus saving time and reducing the likelihood of errors.

However, due to a number of factors including processing capability and network constraints, image-based installation procedures which use data networks to deploy software images to the various target nodes are limited, in that such procedures can only simultaneously deploy a limited number of target nodes. Accordingly, once the deployment threshold of a particular network is reached, the total deployment time may theoretically scale linearly with the number of target devices. Such linear scalability is often not desirable in systems with large numbers of nodes. Accordingly, systems and methods that provide improvement over the linear scalability of conventional image-based software image deployment are desired.

SUMMARY

In accordance with the teachings of the present disclosure, disadvantages and problems associated with the deployment of a software image to a plurality of target devices may be substantially reduced or eliminated. For example, the systems and methods disclosed herein may be technically advantageous because they may provide improvement over the linear scalability sometimes present in conventional image-based software image deployment. In a particular embodiment, a root node device may transmit a software image to a plurality of internal node devices that in turn transmit the software image to one or more other internal node devices and/or leaf node devices.

In accordance with one embodiment of the present disclosure, a system for the deployment of a software image to a plurality of target devices may include a plurality of leaf node devices, a plurality of internal node devices communicatively coupled to the leaf node devices; a root node device communicatively coupled to the plurality of leaf node devices and internal node devices, and a definition file that defines a predetermined deployment ratio (N), the definition file embodied in a computer-readable medium. The root node device may be operable to transmit a software image to N internal node devices. N may be an integer number greater than or equal to 2. Each internal node device may be operable to receive the software image transmitted by the root node device or another internal node device, store the software image in a computer-readable medium associated with the internal node device, and transmit the software image to an aggregate number of internal node devices and leaf node devices not exceeding N. Each leaf node device may be operable to receive the software image transmitted by one of the plurality of internal node devices, and store the software image in a computer-readable medium associated with the leaf node device.

In accordance with another embodiment of the present disclosure, a system for the deployment of a software image to a plurality of target devices may include a plurality of leaf node devices, a plurality of internal node devices communicatively coupled to the leaf node devices, and a root node device communicatively coupled to the plurality of leaf node devices and internal node devices. The root node device may be operable to transmit a software image to internal node devices. Each internal node device may be operable to receive the software image transmitted by the root node device or another internal node device, store the software image in a computer-readable medium associated with the internal node device, and transmit the software image to one or more other internal node devices and leaf node devices. Each leaf node device may be operable to receive the software image transmitted by one of the plurality of internal node devices and store the software image in a computer-readable medium associated with the leaf node device.

In a further embodiment of the present disclosure, a method for the deployment of a software image to a plurality of target devices is provided. The method may include communicatively coupling a root node device to a plurality of internal node devices, and communicatively coupling a plurality of leaf node devices to the root node device and the internal node devices. The root node device may transmit a software image from the root node device to at least two of the internal node devices, and each internal node device may transmit the software image to at least one other internal node device or leaf node device.

Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 7, wherein like numbers are used to indicate like and corresponding parts.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
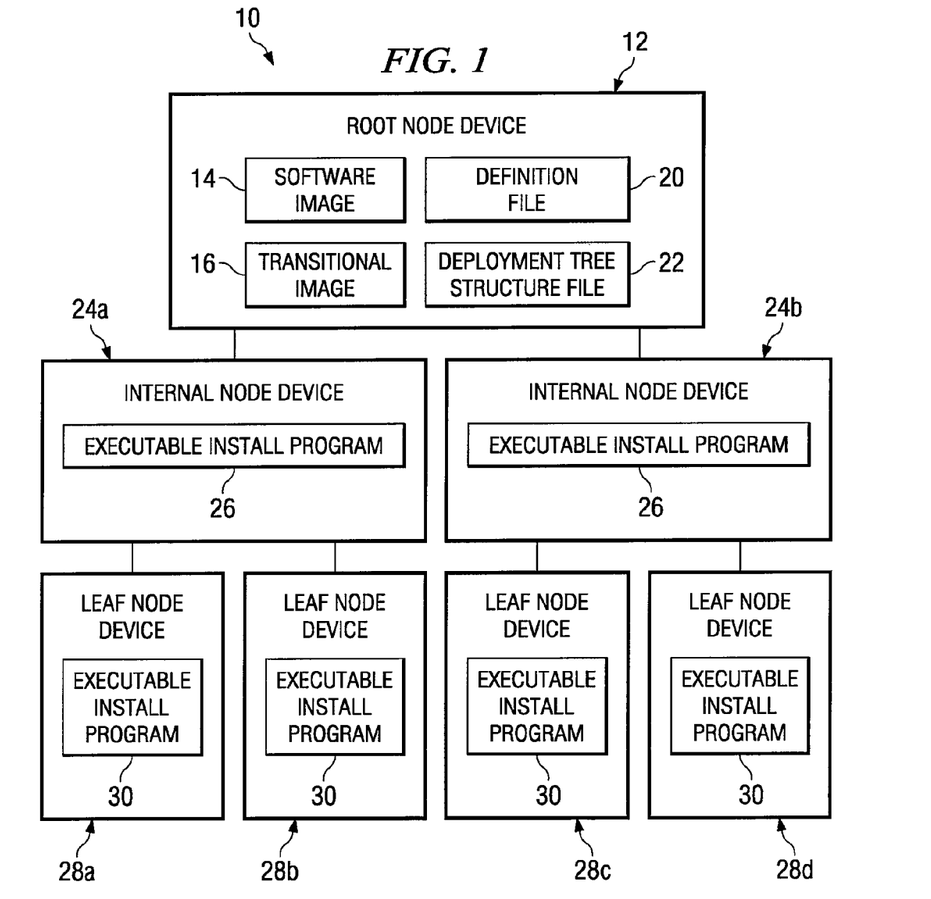
FIG. 1 illustrates a block diagram of an example system for the deployment of a software image to a plurality of target devices, in accordance with teachings of the present disclosure.

FIG. 1 illustrates a block diagram of an example system 10 for the deployment of a software image to a plurality of target devices, in accordance with teachings of the present disclosure. In the illustrated embodiment, system 10 includes a root node device 12, internal node devices 24a and 24b (generally referred to as internal node devices 24), and leaf node devices 28a, 28b, 28c and 28d (generally referred to as leaf node devices 28). As used herein, the term "target devices" may include internal node devices (e.g., internal node devices 24) and leaf node devices (e.g., leaf node devices 28). As used herein, "target device" refers to any information handling system to which software image 14 may be deployed. Each of root node device 12, internal node devices 24 and leaf node devices 28 may be an information handling system, as such term is defined in this disclosure. Root node device 12, internal node devices 24, and leaf node devices 28 may be communicatively coupled to each other by a data network. Although root node device 12, internal node devices 24, and leaf node devices 28 are labeled as different elements of system 10, it is understood that root node device 12, internal node devices 24, and leaf node devices 28, may in some embodiments, be identical or similar to each other in design and/or functionality, while in other embodiments, may be different than each other in design and/or functionality.

Although a specific network is illustrated in FIG. 1, the term "network" should be interpreted as generically defining any network capable of transmitting telecommunication signals, data and/or messages. The network may be a local area network (LAN), a metropolitan area network (MAN), storage area network (SAN), a wide area network (WAN), a wireless local area network (WLAN), a virtual private network (VPN), an intranet, the Internet or any other appropriate architecture or system that facilitates the communication of signals, data and/or messages (generally referred to as media). The network may transmit media using the Fibre Channel (FC) standard, Frame Relay, Asynchronous Transfer Mode (ATM), Internet protocol (IP), other packet-based protocol, and/or any other transmission protocol and/or standard for transmitting media over a network.

Figure 2:
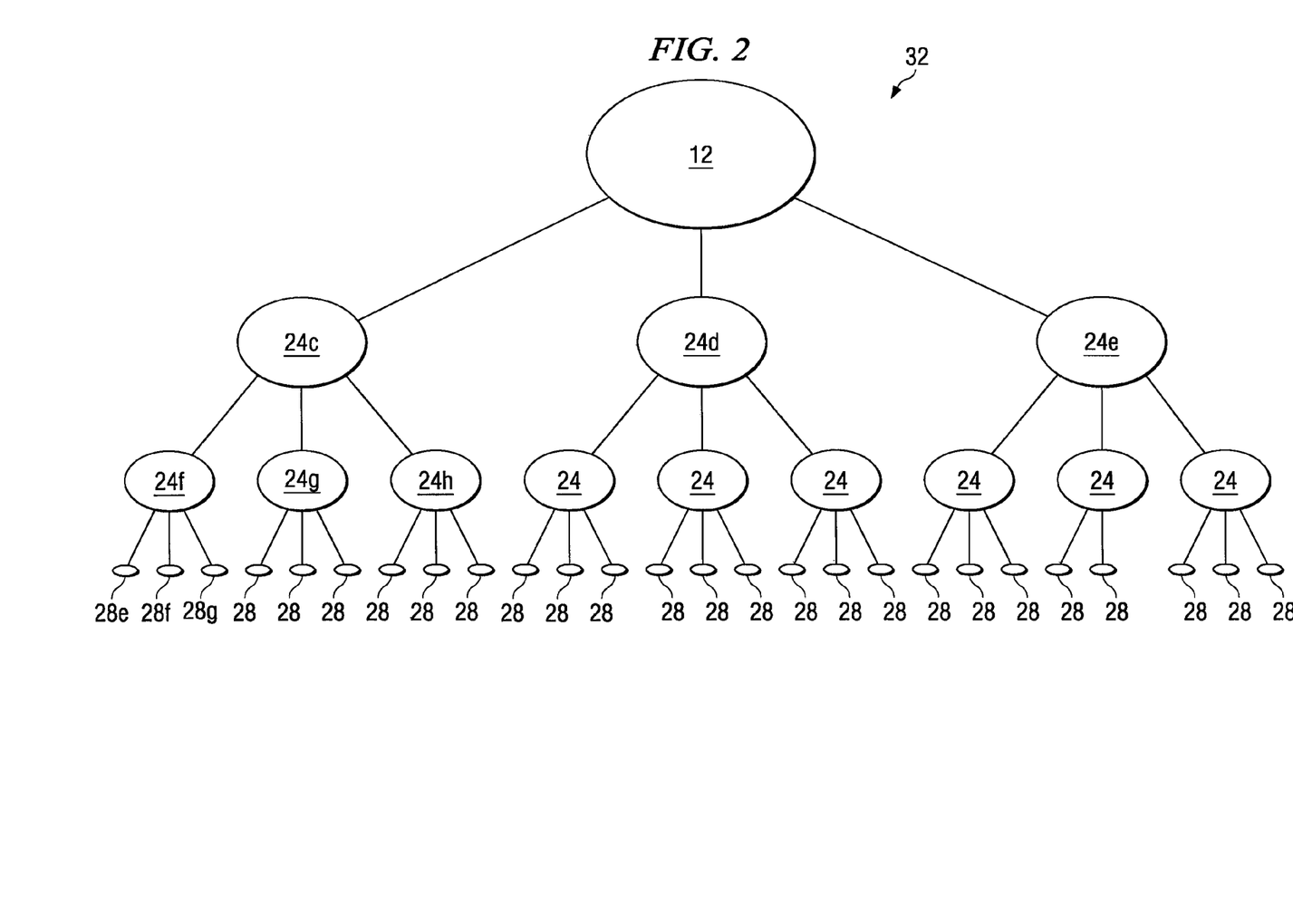
FIG. 2 illustrates a deployment tree in accordance with the teachings of the present disclosure.

Although system 10 is depicted in FIG. 1 as having two internal node devices 24 and four leaf node devices 28, it is understood that system 10 may include any number of internal node devices 24 and leaf node devices 28. Also, although system 10 is depicted as having only one level of internal node devices 24 in FIG. 1, system 10 may have multiple levels of internal node devices 24, for example as illustrated in FIG. 2.

As depicted in FIG. 1, root node devices 12 may include a software image 14 and a transitional image 16. Software image 14 may comprise an operating system, one or more application programs, or any combination thereof that is to be deployed to a plurality of target devices 24 and 28. Transitional image 16 may comprise a program of instructions operable to execute on an internal node device 24, and may include instructions that cause an internal node device 24 to transmit software image 14 to one or more internal node devices 24 and/or leaf node devices 28. In some embodiments, transitional image 16 may comprise software image 14. In the same or other embodiments, transitional image 16 may allow an internal node device 24 to possess many of the functional and operational characteristics of root node device 12. In the same or alternative embodiments, one or more internal node devices 24 may be operable to convert transitional image 16 into software image 14, for example, by self-deploying the software image 14 and rebooting.

Further, as depicted in FIG. 1, root node device 12 may include a definition file 20, which may include configuration information for the deployment of software image 14 throughout system 10. In some embodiments, definition file 20 may define a deployment ratio N, which may determine the maximum number of target devices 24, 28 that may receive software image 14 from root node device 12 or from a particular internal node device 24. N may be an integer number equal to 2 or greater, and may be determined manually or automatically based on any number of factors related to system 10, including without limitation, the network topology of system 10, processing capability of root node device 12, and/or one or more of the target devices 24, 28, and/or the bandwidth of the network coupling root node device 12 and the various target devices 24, 28. In certain embodiments of system 10, root node device 12 may include a deployment tree structure file 22 that may define the parent-child relationships among root node device 12, internal node devices 24, and leaf node devices 28, as described in greater detail below with respect to FIG. 2.

Each internal node device 24 may include an executable install program 26. The executable install program 26 may be operable to receive software image 14 and/or transitional image 16 transmitted by root node device 12 or a parent internal node device 24. Executable install program 26 may also store software image 14 and/or transitional image 16 on a computer-readable medium associated with internal node device 24.

Similarly, each leaf node device 28 may include an executable install program 30. Executable install program 30 may be operable to receive software image 14 transmitted by a parent internal node device 24 and/or store software image 14 on a computer-readable medium associated with internal node device 30. Although each internal node device 24 is depicted as including the same executable install program 26, it is understood that different internal node devices 24 may include different executable install programs 26. In addition, although each leaf node device 28 is depicted as including the same executable install program 30, it is understood that different internal node devices 28 may include different executable install programs 30. Further, although internal node devices 24 and leaf node devices 28 are depicted as using different executable install programs (26 and 30), it is understood that internal node devices 24 and leaf node devices 30 may use the same or similar executable install programs.

Executable install programs 26, 30 may comprise any suitable programs for booting an information handling system in the presence or absence of an operating system, receiving network data, and/or storing data on computer-readable media associated with the particular information handling system. Executable install programs 26, 30 may utilize Preboot Execution Environment (PXE) Boot, Universal Plug and Play (UPnP™), and/or any other suitable program or standard for auto-bootstrapping an information handling system. In certain embodiments, executable install programs 26, 30 may reside locally in one or more of the respective target nodes 24, 28. In the same or other embodiments, executable install programs 26, 30 may be downloaded by one or more target nodes 24, 28 from their respective parent nodes.

FIG. 2 illustrates a deployment tree 32 that may be included in deployment tree structure file 22, in accordance with the teachings of the present disclosure. In particular, FIG. 2 depicts a deployment tree for a system with a deployment ratio of 3 and including root node device 12 and 39 target devices 24, 28. Generally speaking, deployment tree 32 defines the various parent-child relationships among root node device 12 and target devices 24, 28. For example, in the embodiment depicted in FIG. 2, root node device 12 is the parent node of internal node devices 24c, 24d, and 24e, while internal node device 24c is the parent of internal node devices 24f, 24g, and 24h, and internal node device 24f is the parent of leaf nodes 28e, 28f, and 28g. In certain embodiments of the present disclosure, during deployment of software image 14, each target node 24, 28 will receive software image 14 from its respective parent node.

Deployment tree 32 may be created manually (e.g., by a network administrator or other user of system 10) or automatically. Whether created manually or automatically, deployment tree 32 may be created based on numerous factors, including without limitation, the deployment ratio N, the network topology of system 10, processing capability of root node device 12 and/or one or more of the target devices 24, 28, and/or the bandwidth of the network coupling root node device 12 and the various target devices 24, 28, the number of target devices 24, 28, and/or any combination thereof. In addition, deployment tree 32 may be created automatically using procedures such as the DHCP discover procedure for adding target devices depicted in FIGS. 4 and 5.

Figure 3A:
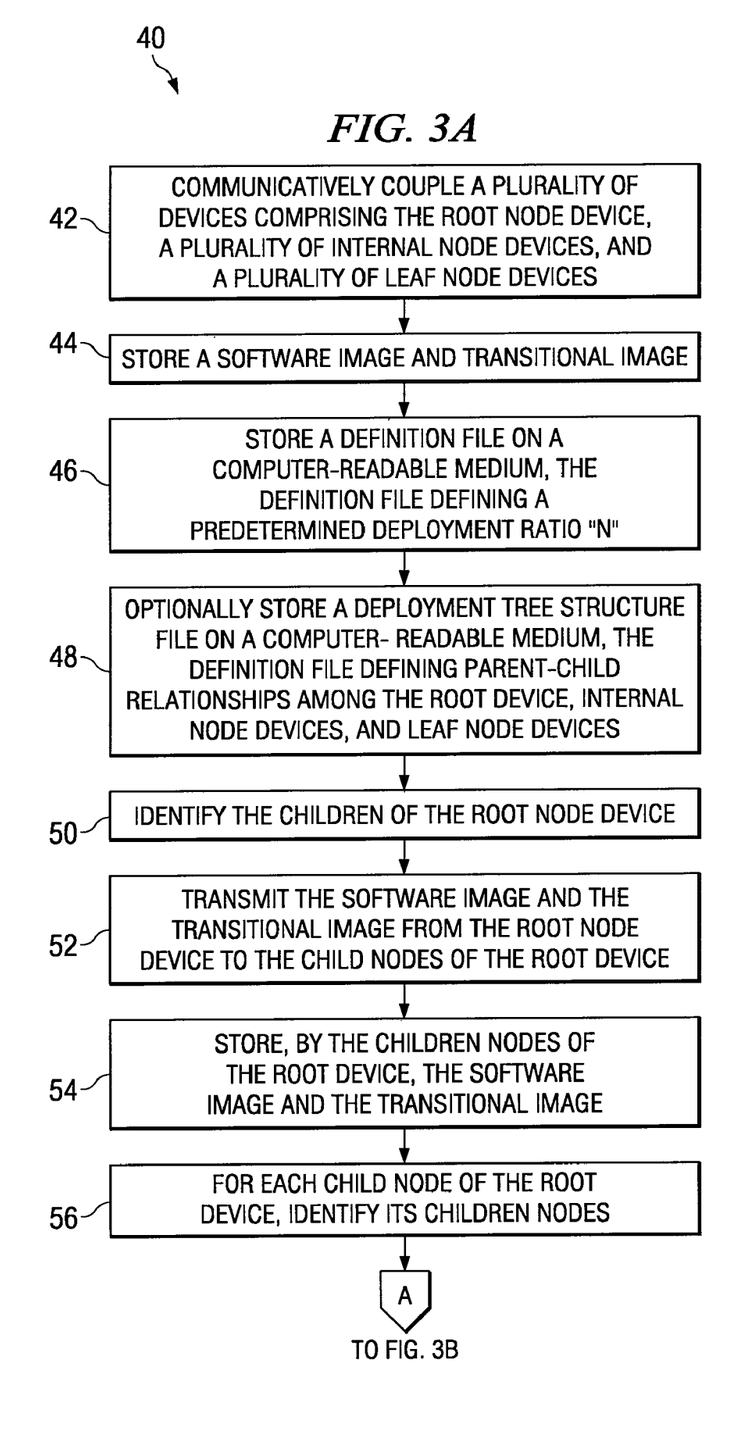
FIG. 3 illustrates a flow chart of a method for the deployment of a software image to a plurality of target devices in accordance with teachings of the present disclosure.
Figure 3B:
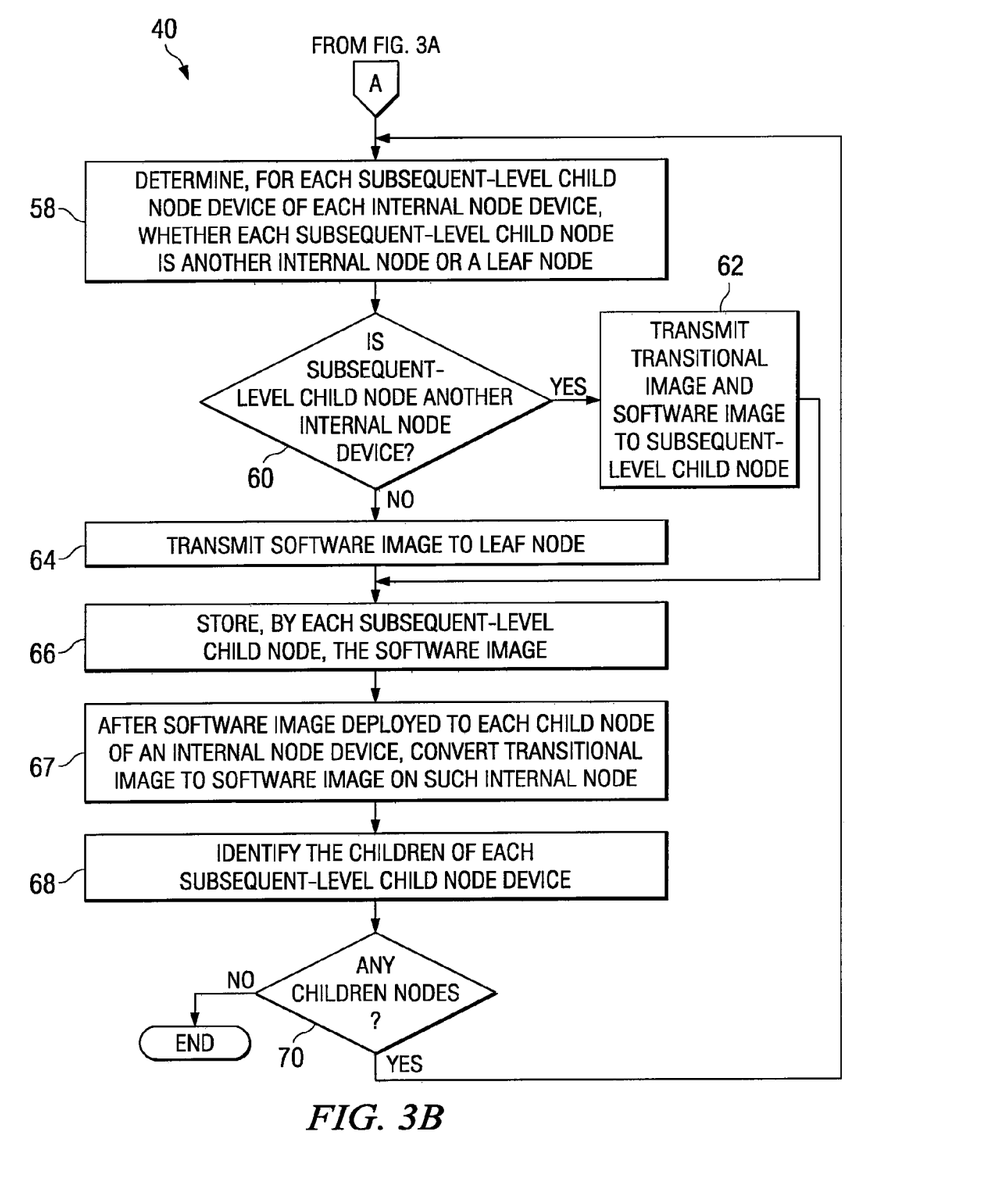

FIG. 3 illustrates a flow chart of a method 40 for the deployment of software image 14 to a plurality of target devices 24, 28 in accordance with teachings of the present disclosure. In one embodiment, method 40 includes communicatively coupling root node device 12 and target devices 24 and 28 to each other and storing a software image 14 on a computer-readable medium. Root node device 12 may transmit the software image 14 to a plurality of internal node devices 24, each of which may in turn transmit the software image 14 to one or more other internal node devices 24 and/or one or more leaf node devices 28.

According to one embodiment, method 40 preferably begins at step 42. Teachings of the present disclosure may be implemented in a variety of configurations of system 10. As such, the preferred initialization point for method 40 and the order of the steps 42-70 comprising method 40 may depend on the implementation chosen.

At step 42, a plurality of devices, including root node device 12, a plurality of internal node devices 24, and a plurality of leaf node devices 28 are communicatively coupled. The devices may be coupled via a local area network (LAN), a metropolitan area network (MAN), storage area network (SAN), a wide area network (WAN), a wireless local area network (WLAN), a virtual private network (VPN), an intranet, the Internet or any other appropriate architecture or system that facilitates the communication of signals, data and/or messages (generally referred to as media). The communicatively coupled devices may transmit media using the Fibre Channel (FC) standard, Frame Relay, Asynchronous Transfer Mode (ATM), Internet protocol (IP), other packet-based protocol, and/or any other transmission protocol and/or standard for transmitting media over a network.

At step 44, software image 14 and transitional image 16 may be stored on a computer-readable medium. At step 46, definition file 20, defining a predetermined deployment ratio N, may be stored on a computer-readable medium. At step 48, deployment tree structure file 22, defining various parent-child relationships among root device 12, internal node devices 24 and leaf node devices 28, may be stored on a computer-readable medium. In certain embodiments, software image 14, transitional image 16, definition file 20, and/or deployment tree structure file 22 may be stored on a computer-readable medium associated with root node device 12.

At step 50, root node device 12 may identify its children nodes. In the embodiments depicted herein, each of the children of root node device 12 is an internal node device 24. In certain embodiments, root node device 12 may identify its children nodes by reference to deployment tree structure file 22. For example, if deployment tree structure file 22 includes deployment tree 32 depicted in FIG. 2, root node device 12 may identify internal node devices 24c, 24d, and 24e as its children nodes. In other embodiments, root node device 12 may identify its children automatically, for example by polling a network to determine the existence of target devices 24, 28 and selecting an appropriate number of internal node devices 24 as its children. In the same or alternative embodiments, target devices 24, 28 may send DHCP discover messages, and root node device 12 may respond with a DHCP response message to an appropriate number of internal node devices 24, and may identify such internal node devices 24 as its children. In the same or alternative embodiments, root node device 12 may identify as its children a number of internal node devices 24 equal to the deployment ratio N.

At step 52, root node device 12 may transmit the software image 14 and/or the transitional image 16 to the child nodes of root node device 12 (e.g., internal node devices 24c, 24d, and 24e of FIG. 2). Each child node may store software image 14 and/or transitional image 16 on a computer-readable medium associated with the respective child node at step 54.

At step 56, each internal node device 24 that is a child of root node device 12 may identify its own children nodes. In certain embodiments, each internal node device 24 may identify its children nodes by reference to deployment tree structure file 22. For example, if deployment tree structure file 22 includes deployment tree 32 depicted in FIG. 2, internal node device 24c may identify internal node devices 24f, 24g, and 24h as its children nodes. In other embodiments, internal node devices 24 may identify their respective children automatically, for example by polling a network to determine the existence of target devices 24, 28, and selecting an appropriate number of internal node devices 24 and/or leaf node devices 28 as its children. In the same or alternative embodiments, target devices 24, 28 may send DHCP discover messages, and internal node devices 24 that have already received and stored software image 14 may respond with a DHCP response message to an appropriate number of target devices 24, 28, and may identify such target devices 24, 28 as its children. In the same or alternative embodiments, each internal node device 24 may identify as its children a number target devices 24, 28 not exceeding to the deployment ratio N.

At step 58, a determination may be made whether each subsequent-level child node of each internal node device 24 that has already received software image 14 is another internal node 24 or a leaf node 28. If, at step 60, a particular subsequent-level child node is another internal node device 24, method 40 proceeds to step 62 where software image 14 and transitional image 16 may be transmitted to the child node by its parent internal node device 24. Otherwise, if at step 60, a particular subsequent-level child node is a leaf node device, method 40 may proceed step 64 where software image 14 may be transmitted to the child node by its parent internal node device 24.

After completion of steps 62 and 64, execution of method 40 may proceed to step 66, where the software image 14 transmitted to the child node by its parent node may be stored. At step 67, after an internal node 24 deploys software image 14 to each of its children nodes, it may convert transitional image 16 running on the internal node 24 into a software image 14.

Each child node of an internal node that is an internal node device 24 may then identify its own child nodes at step 68. At step 70, if the child node has its own children nodes, method 40 may proceed again to step 58 in order to determine whether the child's children nodes are internal node devices 24 and/or leaf nodes 28, and transmit software image 14 and transitional image 16 to the subsequent-level child nodes. Otherwise, if at step 70 the child node has no children of its own (that is, the node is a leaf node), execution of method 40 may end with respect to such node.

Figure 4:
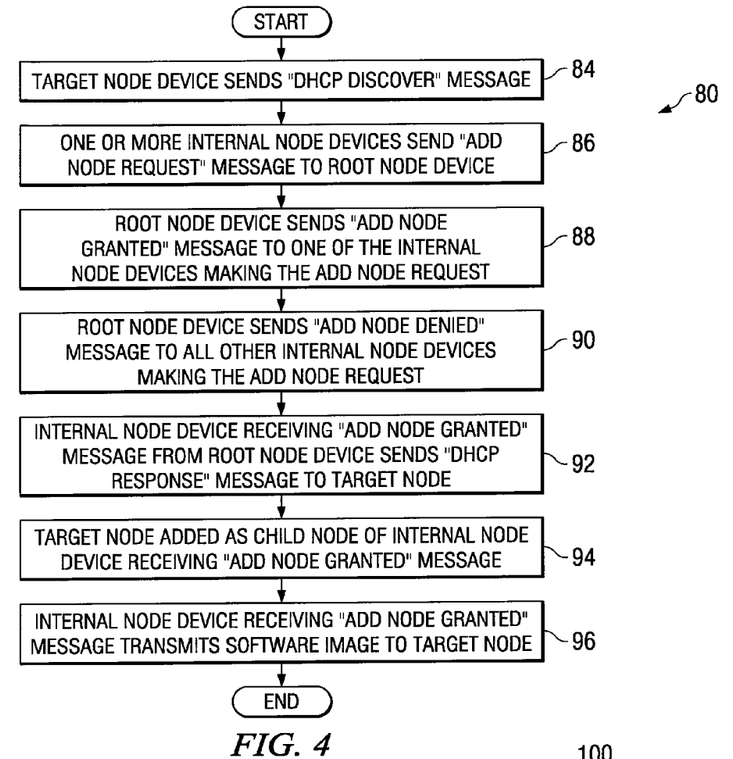
FIGS. 4 and 5 illustrate flow charts of a method for the addition of a target node device to a deployment tree in accordance with teachings of the present disclosure.
Figure 5:
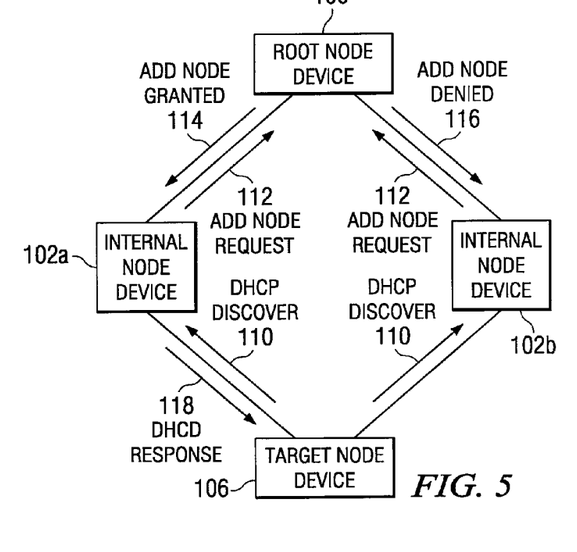

FIGS. 4 and 5 illustrate flow charts of a method 80 for the addition of a target node device 24, 28 to a deployment tree in accordance with teachings of the present disclosure. Method 80 may be used to identify child node devices of root node device 12 and/or an internal node device 24, such as in step 50 and step 68 of method 40 depicted in FIG. 3. In one embodiment, method 80 includes a target node device 106 sending a DHCP DISCOVER message 110 which is received by one or more internal node devices 102. Each internal node device 102 may send an ADD NODE REQUEST message 112 to a root node device 100. In response, root node device 100 may send an ADD NODE GRANTED message 114 to one of the internal node devices 102, and an ADD NODE DENIED message 116 to all other internal node devices 102 sending the ADD NODE REQUEST message 112 with respect to target node device 106. The internal node device 102 receiving the ADD NODE GRANTED message 114 may transmit a DHCP response message 118 to target node device 106, add target node device as a child node, and transmit software image 14 to target node 106.

According to one embodiment, method 80 preferably begins at step 84. Teachings of the present disclosure may be implemented in a variety of configurations of system 10. As such, the preferred initialization point for method 40 and the order of the steps 84-96 comprising method 80 may depend on the implementation chosen.

At step 84, each target node device 106 which has not received software image 14 may send a DHCP DISCOVER message 110 via a network communicatively coupling root node device 100, internal node devices 102, and target node device 106. In the system depicted in FIG. 5, root node device 100 may be similar in design and functionality to root node device 12 of system 10, internal node devices 102 may be similar in design and functionality to internal node devices 24 of system 10, and target node device 106 may be similar in design or functionality to either of internal node devices 24 or leaf node devices 28 of system 10.

At step 86, one or more internal node devices 102 may receive the DHCP DISCOVER message 110 and transmit an ADD NODE REQUEST message 112 to root node device 100. In response, at step 88, root node device 100 may send an ADD NODE GRANTED message 114 to one internal node device 102a which made the ADD NODE REQUEST at step 86. At step 90, root node device 100 may send an ADD NODE DENIED message 116 to all other internal node devices which made the ADD NODE REQUEST at step 86. At step 92, internal node device 102a (which received the ADD NODE GRANTED message 114 at step 86) may send a DHCP RESPONSE message 118 to target node device 106. At step 94, internal node device 102a may add target node 106 as a child node, and add step 96, transmit software image 14 to target node 106.

Figure 6:
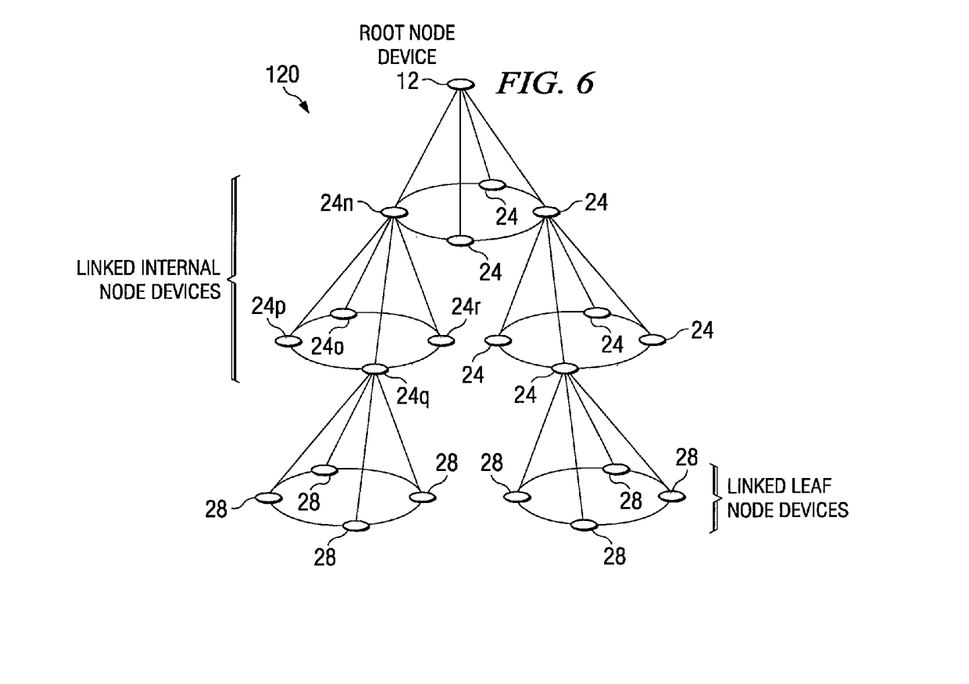
FIG. 6 illustrates a deployment tree including linked sibling nodes in accordance with the teachings of the present disclosure.

FIG. 6 illustrates a deployment tree 120 including linked sibling nodes in accordance with certain embodiments of the present disclosure. As depicted in FIG. 6, each particular target node 24, 28 within a system 10 represented by deployment tree 120 may be operable to transmit at least a portion of software image 14 and/or at least a portion of transitional image 16 to each node having a common parent ("sibling node") with the particular target node. For example, in FIG. 6, internal node device 24n may have children internal nodes 24o, 24p, 24q, and 24r. During deployment of software image 14 throughout the system represented by deployment tree 120, internal node device 24n may transmit at least a portion of software image 14 to each of internal node devices 24o, 24p, 24q, and 24r. Each of internal node devices 24o, 24p, 24q, and 24r may receive its respective portion of software image 14 transmitted by internal node device 24n, and then transmit such portion of software image 14 to its sibling nodes. By linking sibling nodes in this manner, efficiency of deployment may be further improved.

Figure 7:
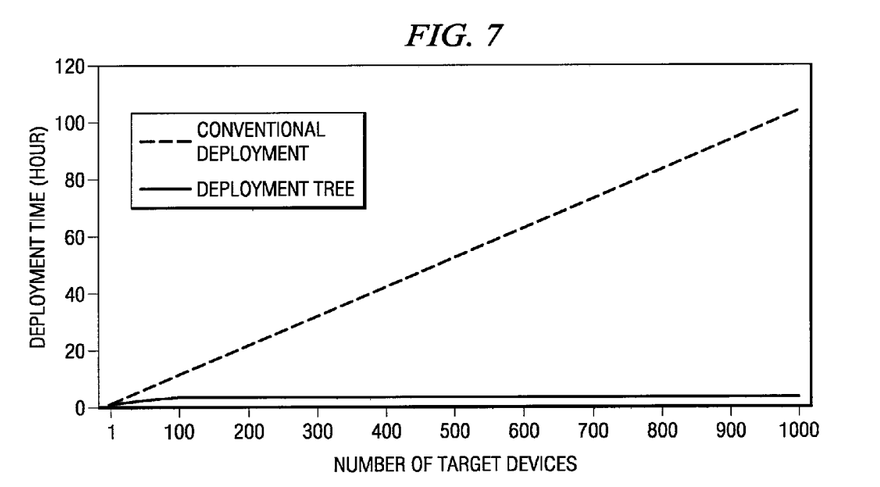
FIG. 7 illustrates a graph depicting a comparison of the deployment time for a network utilizing conventional deployment, as compared to a deployment tree, in accordance with teachings of the present disclosure.

FIG. 7 illustrates a graph depicting a comparison of the deployment time for a network utilizing conventional deployment, as compared to the deployment tree approach set forth in the present disclosure. As shown in FIG. 7, the deployment time using conventional image-based deployment techniques scales linearly with the number of target devices upon which an image is to be deployed. From a theoretical standpoint, deployment time $t_{all}$ using conventional approaches could be approximated by the equation:

$$t_{all} = t_i K/N$$

wherein $t_i$ is equal to the individual deployment time for one target device, K is equal to the number of target devices, and N is the deployment ratio. On the other hand, as shown in FIG. 7, the deployment time using the approaches set forth in this disclosure may scale logarithmically with the number of target devices upon which an image is to be deployed. In fact, from a theoretical standpoint, the deployment time $t_{all}$ using the approaches set forth in this disclosure may be approximated by the equation:

$$t_{all} = \frac{t_i \times \ln(K \times (N-1) + 1)}{\ln N}$$

wherein $t_i$ is equal to the individual deployment time for one target device, K is equal to the number of target devices, and N is the deployment ratio, discussed previously.

Although the present disclosure has been described in detail, it should be understood that various changes, substitutions, and alterations can be made hereto without departing from the spirit and the scope of the invention as defined by the appended claims.

What is claimed is:

1. A system for the deployment of a software image to a plurality of target devices, comprising:
   a plurality of leaf node devices, each leaf node device having only one parent node;
   a plurality of internal node devices communicatively coupled to the leaf node devices, each internal node device having only one parent node;
   a root node device communicatively coupled to the leaf node devices and the internal node devices; and
   a definition file embodied in a computer-readable medium associated with the root node device that defines a predetermined deployment ratio (N) indicating a maximum total number of at least one of the internal node devices and the leaf node devices that are configured to receive a software image from a respective parent node, N being an integer number greater than or equal to 2;
   wherein the root node device is operable to transmit the software image to N of the internal node devices, wherein the software image comprises an operating system;
   wherein each internal node device is a child node of the root node device or one other internal node device, each internal node device operable to:
      receive the software image transmitted by the respective parent node;
      store the software image in a computer-readable medium associated with the internal node device; and
      transmit the software image to an aggregate number of at least one other internal node device and the leaf node devices not exceeding N;
   wherein each leaf node device is a child node of one internal node device, each leaf node operable to:
      receive the software image transmitted by the respective parent node; and
      store the software image in a computer-readable medium associated with the leaf node device; and
   wherein all of the internal node devices and the leaf node devices having the same parent node are operable to transmit to one another at least a portion of the software image.

2. The system of claim 1, further comprising a deployment tree structure file that defines parent-child relationships among the root node device, the internal node devices and the leaf node devices, the deployment tree structure file embodied in the computer-readable medium associated with the root node device.

3. A system for the deployment of a software image to a plurality of target devices, comprising:
   a plurality of leaf node devices, each leaf node device having only one parent node;
   a plurality of internal node devices communicatively coupled to the leaf node devices each internal node device having only one parent node; and
   a root node device communicatively coupled to the leaf node devices and internal node devices;
   a definition file embodied in a computer-readable medium associated with the root node device that defines a predetermined deployment ratio (N) indicating a maximum total number of at least one of the internal node devices and the leaf node devices that are configured to receive a software image from a respective parent node, N being an integer number greater than or equal to 2;
   wherein the root node device is a parent node of N of the internal node devices;
   wherein each internal node device is a parent node of an aggregate number of at least one of other internal node devices and the leaf node devices not exceeding N;
   wherein the root node device is operable to transmit the software image to N of the internal node devices, wherein the software image comprises an operating system;
   wherein each internal node device is a child node of the root node device or one other internal node device, each internal node device operable to:
      receive the software image transmitted by the respective parent node;
      store the software image in a computer-readable medium associated with the internal node device; and
      transmit the software image to an aggregate number of the other internal node devices and the leaf node devices not exceeding N; and
   wherein each leaf node device is a child node of one internal node device, each leaf node operable to:
      receive the software image transmitted by the respective parent node;
      store the software image in a computer-readable medium associated with the leaf node device; and wherein all of the internal node devices and the leaf node devices having the same parent node are operable to transmit to one another at least a portion of the software image.

4. The system of claim 3, further comprising a deployment tree structure file that defines parent-child relationships among the root node device, the internal node devices and the leaf node devices, the deployment tree structure file embodied in the computer-readable medium associated with the root node device.

5. A method for the deployment of a software image to a plurality of target devices, comprising:

communicatively coupling a plurality of devices including a root node device, a plurality of internal node devices, and a plurality of leaf node devices, each internal node device and each leaf node device having only one parent node, each leaf node device being a child node of one internal node device, and each internal node device being a child node of the root node device or one other internal node device;

storing a definition file on a computer-readable medium associated with the root node device that defines a predetermined deployment ratio (N) indicating a maximum total number of at least one of the internal node devices and the leaf node devices that receive a software image from the respective parent node, wherein N is an integer number greater than or equal to 2;

transmitting a software image from the root node device to N of the internal node devices wherein the software image comprises an operating system, the root node device transmits the software image to its respective children nodes; and transmitting the software image from each internal node device to at least one other internal node device or leaf node device, each internal node device transmits the software image to its respective children nodes;

transmitting, by at least one internal node device or leaf node device to another internal node device or leaf node device having the same parent node, at least a portion of the software image.

6. The method of claim 5, further comprising storing a deployment tree structure file on the computer-readable medium associated with the root node device that defines parent-child relationships among the root node device, the internal node devices and the leaf node devices.

7. The method of claim 5, wherein the root node device is a parent node of N of the internal node devices; and wherein each internal node device is a parent node of an aggregate number of at least one of other internal node devices and the leaf node devices not exceeding N.

8. The method of claim 5, wherein transmitting the software image to N of the internal node devices comprises transmitting a transitional image to at least one of the internal node devices, the transitional image operable to, when executed on the at least one of the internal node devices transmit the software image to one or more internal node devices and leaf node devices.

9. The method of claim 8, further comprising:

determining, by at least one internal node device, whether at least one of its children nodes are an internal node or a leaf node;

in response to determining that the at least one child node is an internal node, transmitting the transitional image and the software image to the child node; and in response to determining that the at least one child node is a leaf node, transmitting the software image to the child node.

10. The method of claim 8:

wherein the transitional image comprises the software image, wherein at least one internal node is operable to convert the transitional image into the software image.

* * * * *